(12) United States Patent
Kauhanen

(10) Patent No.: US 8,251,634 B2
(45) Date of Patent: Aug. 28, 2012

(54) TRANSFER PLATE AND METHOD FOR LOADING A CARGO SPACE

(75) Inventor: Jouko Kauhanen, Pieksämäki (FI)

(73) Assignee: Actiw Oy, Naarajarvi (FI)

( * ) Notice: Subject to any disclaimer, the term of this patent is extended or adjusted under 35 U.S.C. 154(b) by 364 days.

(21) Appl. No.: 12/085,979

(22) PCT Filed: Dec. 22, 2006

(86) PCT No.: PCT/FI2006/050585
§ 371 (c)(1),
(2), (4) Date: Jun. 3, 2008

(87) PCT Pub. No.: WO2007/071831
PCT Pub. Date: Jun. 28, 2007

(65) Prior Publication Data
US 2009/0047105 A1  Feb. 19, 2009

(30) Foreign Application Priority Data

Dec. 22, 2005 (FI) .................................... 20055695
Jun. 22, 2006 (FI) .................................... 20065436

(51) Int. Cl.
*B65G 67/00* (2006.01)
(52) U.S. Cl. .................... 414/809; 414/389; 108/57.15; 108/901; 206/386
(58) Field of Classification Search ................. 414/389, 414/400, 402, 809; 108/901, 57.15; 206/386
See application file for complete search history.

(56) References Cited

U.S. PATENT DOCUMENTS

| 1,570,119 | A | * | 1/1926 | Baxter | 414/389 |
| 1,785,169 | A | * | 12/1930 | Young | 414/572 |
| 2,802,583 | A | * | 8/1957 | Dansereau | 414/534 |
| 3,262,588 | A | * | 7/1966 | Davidson | 414/536 |
| 3,727,777 | A | | 4/1973 | Hanson | |
| 4,011,668 | A | * | 3/1977 | Gunderson | 37/260 |
| 4,077,590 | A | * | 3/1978 | Shorey | 410/77 |
| 4,408,739 | A | * | 10/1983 | Buchsel | 244/137.1 |
| 5,017,076 | A | * | 5/1991 | Condrey | 414/345 |
| 5,054,987 | A | * | 10/1991 | Thornton | 414/390 |
| 5,186,596 | A | * | 2/1993 | Boucher et al. | 414/395 |
| 6,021,533 | A | * | 2/2000 | Ellis et al. | 5/600 |
| 7,695,235 | B1 | * | 4/2010 | Rallis | 414/400 |

FOREIGN PATENT DOCUMENTS

| GB | 2 059 379 | 4/1981 |
| WO | 9523105 | 8/1995 |

* cited by examiner

*Primary Examiner* — Scott Lowe
(74) *Attorney, Agent, or Firm* — Fildes & Outland, P.C.

(57) ABSTRACT

The invention relates to a transfer plate for loading a cargo space. The transfer plate is intended to be moved, together with cargo units, into the cargo space and back again, the cargo units remaining in the cargo space. Rolling elements are arranged, over at least part of the length of the transfer plate, on the side of it facing the cargo units to permit movement between the transfer plate and the cargo units. The transfer plate is mainly of plastic and the thickness of the structure formed by the transfer plate and the rolling elements are less than 70 millimeters. The invention also relates to a method for loading a cargo space.

9 Claims, 5 Drawing Sheets

TRANSFER PLATE AND METHOD FOR LOADING A CARGO SPACE

Figure 1:
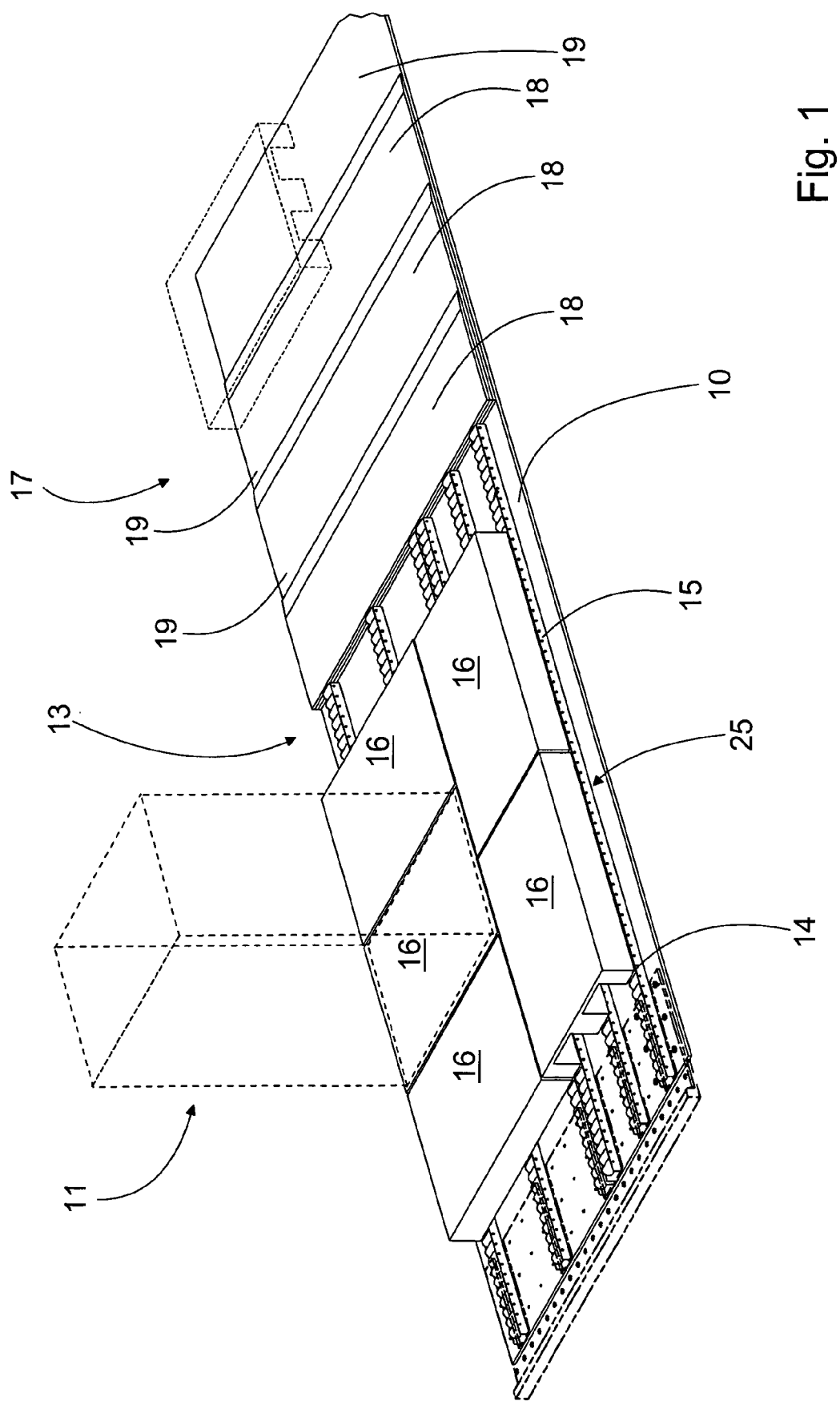

The present invention relates to a transfer plate for loading a cargo space, which transfer plate is intended to be moved, together with cargo units, into the cargo space and back again, the cargo units remaining in the cargo space, rolling elements being arranged over at least part of the length of the transfer plate, on the side of it facing the cargo units, to permit movement between the transfer plate and the cargo units. The invention also relates to a method for loading a cargo space.

WO application publication number 9523105 discloses a method and apparatus for loading products to be transported into a cargo space. The apparatus disclosed utilizes a transfer plate, on top of which the load is first formed. Next, the load together with the transfer plate is pushed into the cargo space, after which the transfer plate is pulled out from under the load. The load is supported during the pulling. In the method, the products are first loaded onto a transfer plate that is outside the cargo space and can be pushed into the cargo space from a side of the cargo space that is entirely open. After this, the products are transferred to the interior of the cargo space by pushing the transfer plate in over the bottom of the cargo space. Finally, the products are supported from the open side and the transfer plate is pulled out from between the bottom of the cargo space and the products. In the apparatus, there is a frame supporting a movable transfer plate. The apparatus also includes transfer means for moving the transfer plate and the products into the cargo space, and for pulling the transfer plate away from between the bottom of the cargo space and the products.

The transfer plate is only suitable for certain types of cargo unit, which slide sufficiently well on the transfer plate. However, in practice it would be impossible to pull the disclosed transfer plate from beneath generally utilized pallets.

In addition, the stresses caused by friction would become too great for both the pallets and the actual apparatus. In addition, the apparatus becomes large in size, because the friction causes a great resistance. The cargo units must also be placed individually onto the transfer plate, which is slow and demands a large loading space.

WO application publication number 0208113 discloses an accessory for a fork-lift truck, by means of which a largish bundle of timber is pushed into a cargo space. The operation of the accessory is based on idler wheels, on which the timber bundle is moved. Thus the frame of the accessory must be especially rigid while a great linear load is imposed on the floor of the cargo space. Correspondingly, the accessory can only be used to load specific types of cargo space. In order to facilitate pulling the accessory out, there is a plate with a few rollers in the accessory. Thus by utilizing the accessory it is impossible to load the entire cargo space at one time. It is also impossible to load cargo units placed on pallets, mainly due to the danger of falling and the large drop. In addition, the full height of the cargo space remains unused, due to the sloping operating position of the accessory. When an accessory is in question, it is impossible to automate loading.

The invention is intended to create a new type of transfer plate for loading a cargo space, which is suitable for many different kinds of cargo unit and especially for the automatic loading of pallets. The invention is also intended to create a new type of method for loading a cargo space, by means of which excessive stresses are avoided in the cargo units and the apparatus, and which can be used in connection with different kinds of conveyor system. The transfer plate according to the invention is plastic and in it there are surprisingly simple rolling elements between the cargo units and the transfer plate. Thus the structure of the transfer plate remains simple and advantageously thin. At the same time, the cargo units can be transferred onto the transfer plate even by pushing, while when the transfer plate is removed the pressure of the queue in the cargo unit remains advantageously small. This is achieved particularly by using freely rotating rolling elements, which further simplifies the structure and operation of the transfer plate. According to the invention, the load is indeed preferably formed by pushing the cargo units onto the transfer plate. Such a solution is easy to automate and it particularly well suited to pallets. At the same time, it is possible to even use pallets of different sizes when forming the load. In addition, in the method it is possible to use even existing apparatuses and transfer plates, once the transfer plates have been equipped with rolling elements according to the invention.

Figure 2:
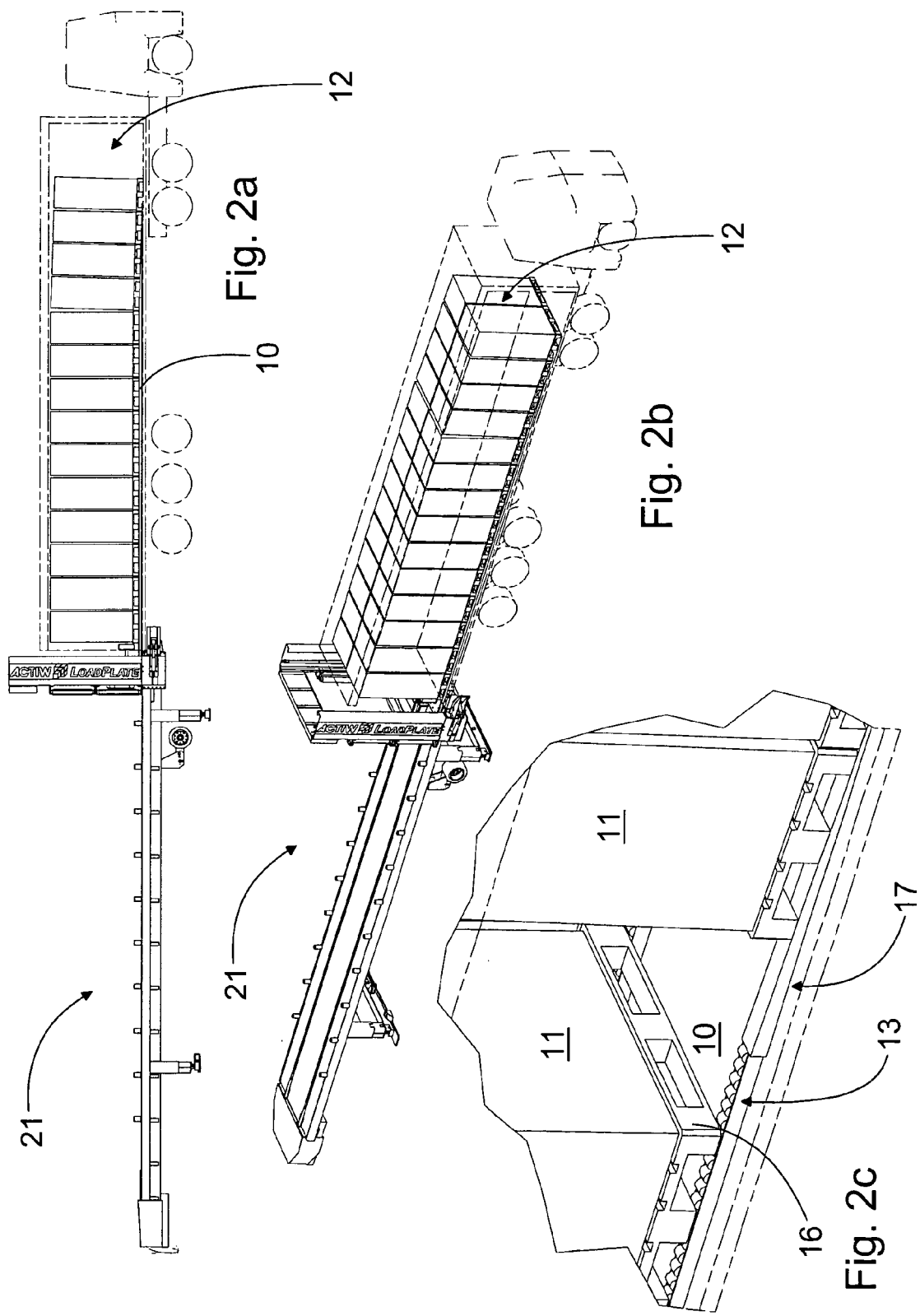
Figure 3:
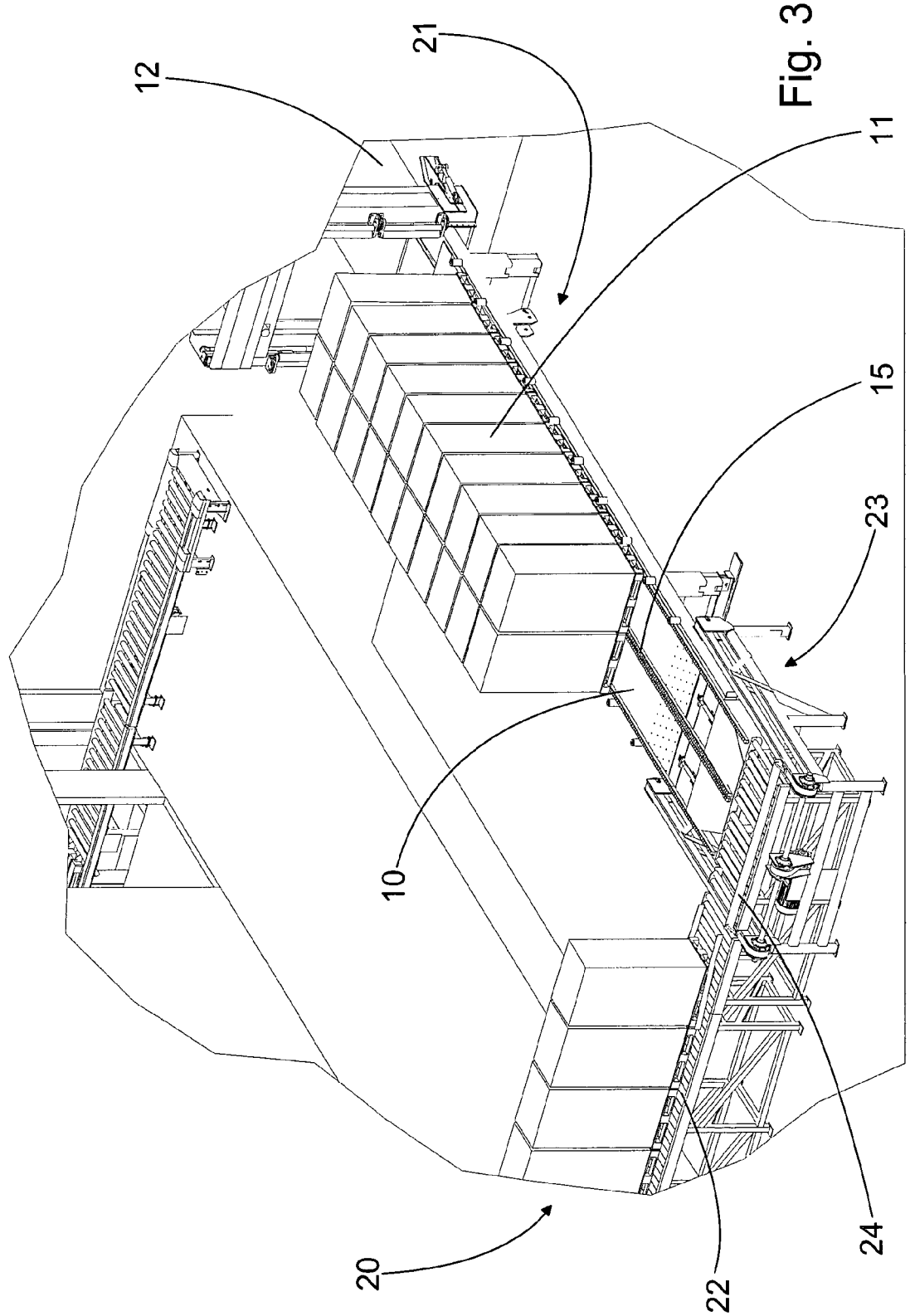
Figure 4:
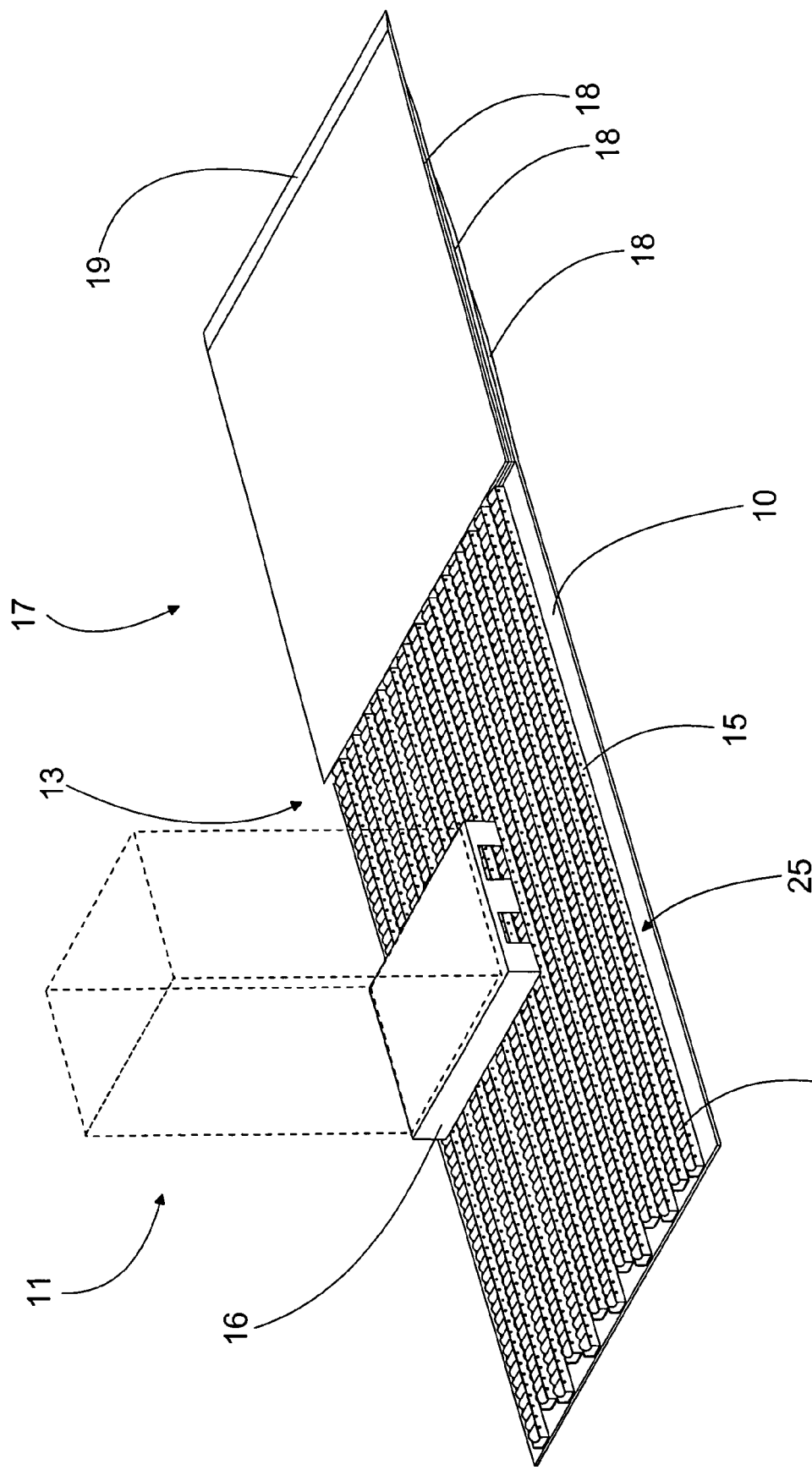
Figure 5:
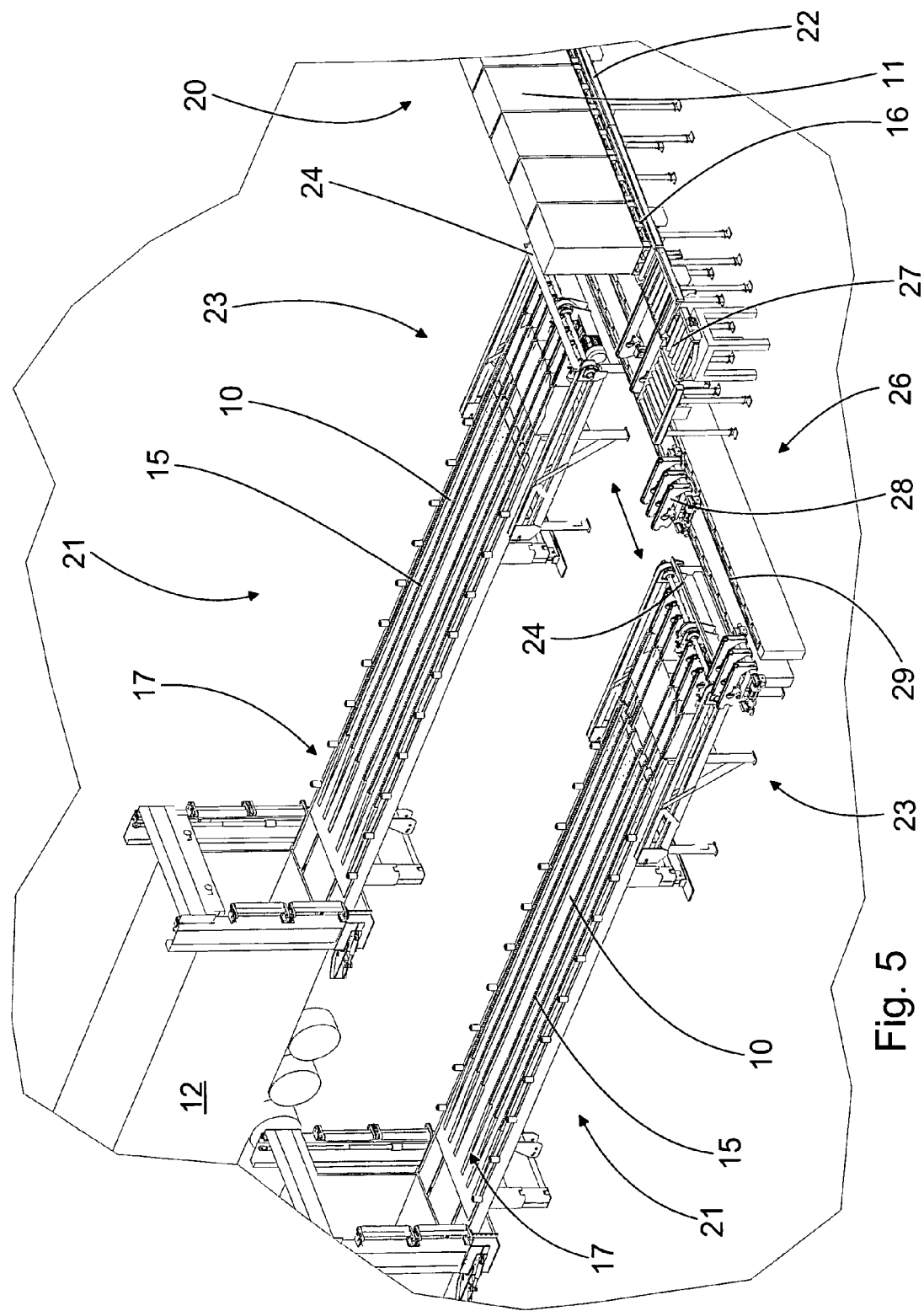

In the following, the invention is examined in detail with reference to the accompanying drawings depicting some applications of the invention, in which FIG. 1 shows an axonometric view of the transfer plate according to the invention, FIG. 2a shows a side view of part of an apparatus applying transfer plates according to the invention, FIG. 2b shows an axonometric view of the components of FIG. 2a, FIG. 2c shows an enlargement of part of FIG. 2b, FIG. 3 shows a second application of the apparatus applying transfer plates according to the invention, FIG. 4 shows an axonometric view of a second application of the transfer plate according to the invention, FIG. 5 shows a third application of the apparatus applying transfer plates according to the invention.

FIG. 1 shows a transfer plate 10 according to the invention, which is exploited when loading a cargo space. The transfer plate 10 is intended to be transferred to the cargo space 12 together with the cargo units 11, and to be moved back, leaving the cargo units 11 in the cargo space 12 (FIGS. 2a and 2b). According to the invention, rolling elements 13 are arranged, over part of the length of the transfer plate 10, on the surface of it facing the cargo units 11, to permit movement between the transfer plate 10 and the cargo units 11. Thus the formation of the load is facilitated and the stresses acting on the cargo units and the transfer plate are clearly reduced from known cases. The stresses in the cargo units and the rest of the apparatus too are reduced from those in existing cases.

The construction, size, and number of the rolling elements can vary in different applications. In the applications shown, the rolling elements 13 are freely rotating rollers 14, from which rolling rails 15 are formed in the longitudinal direction of the transfer plate 10. In the application of FIG. 1, there are six rolling rails 15 over the transverse direction of the transfer plate 10 and they are attached through the plastic transfer plate by means of bolts beneath it. Each rolling rail 15 is formed by freely rotating rollers 14, fitted in a line after each other and bolted to a U-profile. The size, load-bearing capacity, and number of the rolling rails 15 are selected mainly on the basis of the bottom construction and load pattern of the cargo units. In the applications shown, the cargo units 11 are products placed on pallets 16. The rollers or other rolling elements can also be partly embedded in the transfer plate, in order to keep its total thickness as small as possible.

The rolling rails 15 extend from the start of the transfer plate 10 over nearly the entire length of the transfer plate 10. However, at the end of the transfer plate 10, a ramp 17 is arranged from the rolling elements 13 to the cargo space 12. With the aid of the ramp 17, an even movement of the cargo units 11 to the cargo space 12 is achieved, without large drops when the transfer plate is pulled out from under the cargo units. In the application of FIG. 1, the ramp 17 is formed by bolting three sliding plastic sheets, at the edges of which there are, in addition bevels 19, on top of the transfer plate 10. In FIG. 2a, the first pallet is nearly entirely in the cargo space 12, the three following pallets being still on the ramp. A functional ramp can also be implemented using a different construction. For example, thin plastic sheets can be used, in which case a ramp with small steps is formed. In the application of FIG. 5, a functional ramp is formed from plastic wedges arranged as continuations of the rolling rails.

According to the invention, the ramp 17 is of the same material as the transfer plate 10. Thus the sliding properties remain unchanged in the cases of both the cargo unit and of the cargo space. In practice, the length of the ramp is 500-3000 mm, preferably 800-2400 mm, in which case there will be little tilting of the cargo units. An important factor is also the thinness of the end of the ramp. According to the invention, at the end of the transfer plate the thickness of the ramp is 5-20 mm, preferably 10-15 mm. This avoids the cargo units tilting as they leave the transfer plate and thus the separation of the cargo units. In other words, a cargo unit does not drop off the transfer plate, but slides in a controlled manner without tilting. The cargo space can then be exploited as efficiently as possible, as the consecutive cargo units remain touching each other. At the same time, damage to the cargo units is avoided.

FIG. 4 show a second application of the transfer plate according to the invention. In this case, the rolling rails 15 are set tightly against each other and cover nearly the entire width of the transfer plate. According to the invention, the rolling elements 13 cover essentially the entire width of the transfer plate 10. It is then possible to use different types of pallets, which can also be placed facing different ways, without tilting or breaking the pallets. In addition, the pallets can be placed independently of the transfer plate. The transfer plate 10 is mainly of plastic, so that it will slide well, for example, along the bottom of the cargo space. In practice, the surface of the transfer plate opposite to the rolling elements is essentially smooth. In addition, the thin transfer plate conforms to unevenness in the bottom of the cargo space, and even permits uneven cargo-space bottoms. In addition, the weight of the load is distributed evenly over the area of the cargo space while there can be even large openings in the cargo space. In addition, the plastic transfer plate slides on different types of bases without sticking to them. Thus the floor of the cargo space can be of steel, wood, plywood, or aluminium. Thanks to its novel and simple construction, the thickness of the structure formed by the transfer plate and the rolling elements is surprisingly small. The thickness of even transfer plates dimensioned for heavy-duty applications is less than 70 mm. In general, the thickness of the structure formed by the transfer plate and the rolling elements is 40-70 mm. Thus, particularly when being removed from the transfer plate the cargo units tilt very little, which reduces the danger of damage to the cargo units and the cargo space. Tilting is further reduced by the ramp described above.

According to the invention, the rolling elements adjacent to each other in the direction of the width of the transfer plate are arranged at different locations relative to each other in the longitudinal direction of the transfer plate. This further reduces friction. In addition, a even and soft motion is achieved, as the downswings between the rollers occur at different times. In FIG. 4, overlapping of this kind is achieved by attaching the rolling rails 15 to slightly different positions in the transfer plate 10. In FIGS. 1 and 4, the rolling rails 15 are full length, so that they stiffen the transfer plate 10. In some applications, on the other hand, it may be preferable for the transfer plate to flex. In that case, short rolling rails are used, so that the transfer plate will flex and conform to the shapes of the cargo space. Flexing is required especially at the junction between the transfer means and the cargo space.

According to the invention, the rolling elements are thus preferably freely rotating rollers. Rollers of this kind are durable and create a simple but functional transfer plate. At the same time, the total thickness of the transfer plate remains advantageously small. The rolling rail 15 described above is formed from a structural profile 25, which is attached to the transfer plate 10. In addition, several rollers 14 are supported to be freely rotating in the structural profile 25. The construction in question is simple and the rolling rails can be prefabricated and then attached to the transfer plate. In one preferred application, the basic shape of the structural profile is in the form of a U and there are several separate structural profiles set one after the other, in order to achieve the said flexibility. In practice, the rolling rails are attached laterally at a sufficient distance from each other to permit an individual roller to be changed without detaching the structural profile. In practice, the diameter of the roller is about 50 mm and its length is about 100 mm. There are about fifteen such rollers to each meter of length in the structural profile.

In addition to the rolling elements, the ramp in the application of FIG. 4 differs from that in the application of FIG. 1. In this case, uppermost is a single long sliding plastic 18, under which are fitted three sliding plastics equipped with bevels. The pallets then slide into the cargo space without tilting and without jolting. Generally, after the part of the distance defined by the rolling elements, the remaining length of the transfer plate is arranged as a ramp from the rolling elements to the cargo space. In practice, the ramp can be implemented in different ways, the length of the ramp being a maximum of about 20 percent of the total length of the transfer plate. The thickness of the plastic transfer plate is about 20 mm and the largest transfer plates that have been tested so far have been dimensioned for loading a 45-foot intermodal container. In such a case, the length of the transfer plate is more than thirteen meters. Generally, a transfer plate with a thickness of 10-30 mm, preferably 15-25 mm, is used in loading.

Thus, the transfer plate is used for loading a cargo space. The cargo space is most usually the cargo space of a vehicle, or the aforesaid intermodal container. On the other hand, the transfer plate can be used to load even an open platform, if it is unnecessary to protect the cargo units. In the method, the load is formed on the transfer plate 10 from cargo units 11, after which the transfer plate 10 with the load is transferred to the cargo space 12. Finally, the transfer plate 10 is moved away from the cargo space 12, while the cargo units 11 remain in the cargo space 12. According to the invention, rolling elements 13 are arranged at least over part of the length of the transfer plate 10 on its surface facing the cargo units 11, in order to permit movement between the transfer plate 10 and the cargo units 11. In practice, in loading a transfer plate 13 made mainly of plastic is used, which is arranged to slide over the structure delimited by the cargo space 12. The plastic sheet is thin and flexible, but withstands well pushing and pulling. Thanks to the rolling elements according to the invention, particularly the force required for pulling is considerably less than previously. In addition, the construction of the transfer plate remains simple, as the sets of rollers and the ramp lack the drive devices that appear in known apparatuses. In practice, the transfer plate is moved using the transfer devices described, which include a gate structure, by means of which the load is supported when the transfer plate is pulled out from under the load.

According to the invention, the load is formed on the transfer plate 10 by means of a conveyor system 20. In other words, when forming the load a conveyor system 20 is used, by means of which the cargo units 11 are fed to a filling device 23 arranged in connection with the transfer plate 13 (FIG. 3). FIGS. 2a and 2b show transfer devices 21 for moving the transfer plate 10. Transfer devices of this kind can be fitted simply as part of the conveyor system. In practice, the transfer plate 13 is moved using transfer devices 21, the cargo units 11 being pushed by the filling device 23 onto the transfer plate 10 fitted on top of which, in order to form a load. Pushing is an economical and rapid way to move pallets, when the transfer plate has freely rotating rolling elements according to the invention. FIG. 3 shows one example of a conveyor system. In this case, products placed on pallets 16 are moved from an automated warehouse over a roller track to the filling device 23. Thus the filling device 23 is part of the conveyor system 20 and is used to push the cargo units 11 onto the transfer plate 10. In this case, a pusher beam 24 is used to push the cargo units 11 by their pallets 16. The cargo units can also be placed on the filler device using, for example, a robot or manipulator.

FIG. 5 shows a third application of an apparatus applying the transfer plate according to the invention. The same reference numbers are used for components that are functionally similar. In this case too, the pallets 16 are brought by a roller track 22 forming a transfer conveyor to the loading area, in which there are two filling devices 23 and two transfer plates 10 with transfer devices 21. Thus according to the invention there are at least two transfer devices and there is an intermediate conveyor 26 between the transfer conveyor and the filler devices 23. Thus while one transfer plate is being moved into the cargo space the other transfer plate can be already being filled. If necessary, several filler devices can be arranged in the loading area. According to the invention, a turning device 27, for turning the pallets 16, is, in addition, arranged in connection with the intermediate conveyor 26. Thus a pallet need not be turned until the final stage. Similarly, a single transfer plate can even be loaded with pallets of different sizes and the placing of the pallets can be optimized. In the application of FIG. 5, the intermediate conveyor is formed of a transfer device 28, which moves on guides 29 from the transfer conveyor to one or other of the filling devices 23.

The rolling elements according to the invention can be used to update even existing conveyor systems based on a transfer plate. According to the invention, the rolling elements are attached to an already existing transfer plate. Thus a new kind of apparatus can be created easily by attaching a sufficient number of rolling rails, or other rolling elements to a plastic transfer plate. The power requirement is reduced while the same time it becomes possible to make even more complex load patterns safely and rapidly.

The plastic transfer plate according to the invention slides easily over the bottom of the cargo space. In addition, the transfer plate is a good attachment base for the rolling rails, on top of which the cargo units move lightly as the rollers freely rotate. At the same time, the transfer plate becomes advantageously low and conforms to the shapes of the cargo space. The transfer plate according to the invention can well be applied to load formation made using conveyors and systems. At the same time, the queue pressure caused in the products being loaded, by pulling the plastic transfer plate out of the cargo space, is reduced.

The invention claimed is:

1. A moveable transfer plate for loading a cargo space having a delimiting bottom structure, said transfer plate being moveable together with a load of cargo units into the cargo space and back again, the cargo units remaining in the cargo space, said moveable transfer plate comprising:
    a frameless longitudinally extending flexible plastic sheet without any rigid continuous frame, said flexible plastic sheet being arranged to withstand pushing and pulling with cargo loaded thereon;
    said flexible plastic sheet having an upper cargo facing surface and an opposite lower surface;
    said flexible plastic sheet upper cargo facing surface including a track roller portion including a plurality of longitudinally extending track rollers, each track roller including rolling elements permitting movement between the transfer plate and the cargo units, and said flexible plastic sheet upper cargo facing surface also including a ramp portion adjacent said track roller portion;
    a combined thickness of the flexible plastic sheet and the rolling elements is 70 mm or less;
    said ramp being at the same elevation of the rolling elements adjacent said track roller portion and longitudinally tapering toward an end of the transfer plate and having a thickness of 5-20 mm at said end thereof; and
    said opposite lower surface of said flexible plastic sheet is smooth and continuous at least in the length of said track rollers and arranged to slide over the delimiting bottom structure of the cargo space.

2. The moveable transfer plate according to claim 1, characterized in that the thickness of said transfer plate is 40-70 mm.

3. The moveable transfer plate according to claim 1, characterized in that said track roller portion includes track rollers covering essentially the entire width of the flexible plastic sheet.

4. The moveable transfer plate according to claim 1, characterized in that, in the direction of the width of the flexible plastic sheet, the track rollers are arranged such that said rolling elements are at different points relative to each other in the longitudinal direction of the flexible plastic sheet.

5. The moveable transfer plate according to claim 1, characterized in that said rolling elements are freely rotating rollers.

6. The moveable transfer plate according to claim 1, characterized in that the ramp length is 500-3000 mm.

7. A method for loading a cargo space having a delimiting bottom structure, said method comprising the steps of:
    loading cargo units onto a transfer plate including a frameless longitudinally extending flexible plastic sheet without any rigid continuous frame, the flexible plastic sheet being arranged to withstand pushing and pulling with cargo loaded thereon, the flexible plastic sheet having an upper cargo facing surface and an opposite lower surface, the flexible plastic sheet upper cargo facing surface including a track roller portion including a plurality of longitudinally extending track rollers, each track roller including rolling elements permitting movement between the transfer plate and the cargo units, and a ramp portion adjacent said track roller portion, a combined thickness of the flexible plastic sheet and the rolling elements is 70 mm or less, the ramp being at the same elevation of the rolling elements adjacent said track roller portion and longitudinally tapering toward an end of the flexible plastic sheet and having a thickness of 5-20 mm at said end thereof, and the opposite lower surface of the flexible plastic sheet is smooth and continuous at least in the length of said track rollers and arranged to slide over the delimiting structure of the cargo space, moving the transfer plate together with the loaded cargo units, into the cargo space by sliding the lower surface of the flexible plastic sheet over the delimiting bottom structure of the cargo space, and subsequently moving the transfer plate out of the cargo space by pulling the transfer plate out from underneath the cargo units, thereby leaving the cargo units to remain in the cargo space.

8. Method according to claim 7, wherein a conveyor system is used to deliver cargo units to said transfer plate.

9. Method according to claim 7, characterized in that the transfer plate is moved using transfer devices, and the cargo units are pushed by a filling device onto and off of the transfer plate.

\* \* \* \* \*